United States Patent [19]

Oder

[11] 4,147,632
[45] Apr. 3, 1979

[54] AUGMENTING AND FACILITATING FLUSHING IN MAGNETIC SEPARATION

[75] Inventor: Robin R. Oder, Novato, Calif.

[73] Assignee: J. M. Huber Corporation, Locust, N.J.

[21] Appl. No.: 861,787

[22] Filed: Dec. 19, 1977

Related U.S. Application Data

[62] Division of Ser. No. 731,398, Oct. 12, 1976, Pat. No. 4,087,358.

[51] Int. Cl.² ............................................. B01D 35/06
[52] U.S. Cl. ................................... 210/222; 210/315; 210/342; 210/489; 210/503
[58] Field of Search ................. 210/425, 222, 223, 79, 210/82, 497, 508, 407–412, 384, 488; 209/232

[56] References Cited
U.S. PATENT DOCUMENTS

| | | | |
|---|---|---|---|
| 2,398,725 | 4/1946 | Shutte | 209/232 |
| 2,711,254 | 6/1955 | Allard | 210/384 |
| 3,127,255 | 3/1964 | Winslow | 210/223 |
| 3,292,790 | 12/1966 | Turr et al. | 210/488 X |
| 3,477,948 | 11/1969 | Inoue | 210/223 X |
| 3,539,509 | 11/1970 | Hermann et al. | 210/222 |
| 3,550,777 | 12/1970 | Smyleton | 210/488 |
| 3,567,026 | 3/1971 | Kolm | 210/222 |
| 3,838,773 | 10/1974 | Kolm | 210/223 |
| 3,869,390 | 3/1975 | Herrmann | 210/222 |
| 4,052,310 | 10/1977 | Nolan | 210/222 |
| 4,087,358 | 5/1978 | Oder | 210/42 S |

*Primary Examiner*—Theodore A. Granger
*Attorney, Agent, or Firm*—Harold H. Flanders

[57] ABSTRACT

Apparatus for augmenting or facilitating flushing of impurities collected by a porous ferromagnetic matrix. The matrix is contained in a canister, through which an aqueous clay slurry is flowed as an applied field magnetizes the matrix to enable attraction of the discoloring magnetics. The periodic flushing of the matrix is rendered of increased efficacy, by applying auxiliary mechanical forces to dislodge the magnetics; or other disclosed means and methods may be used to facilitate the flushing operation.

6 Claims, 4 Drawing Figures

AUGMENTING AND FACILITATING FLUSHING IN MAGNETIC SEPARATION

This is a division of application Ser. No. 731,398 filed Oct. 12, 1976, now U.S. Pat. No. 4,087,358.

BACKGROUND OF INVENTION

This invention relates generally to the technology of magnetic separation, and more specifically to apparatus for removal of magnetically more susceptible minute particles, often present in minor concentrations as discoloring impurities, from aqueous slurries of minute mineral particles such as obtained by dispersing clay, e.g. a crude kaolin clay, in water.

The iron content of commercial deposits of kaolin is generally on the order of from approximately 0.2% to 2%. Even recent publications indicate a continuing dispute as to whether the iron contaminants are in discrete form, or in a combined form within a kaolin lattice structure. While the form of this iron in clay has not been definitely established, recent evidence indicates that a portion is concentrated in or associated with nonkaolin contaminants, such as titanium oxides, etc. Whatever its form, iron contamination reduces brightness in clay, and the degree of discoloration of the clay generally increases with the amount of iron present.

In the foregoing connection, it has been known for some time that magnetically attractable contaminants can, to a degree, be removed from aqueous slurries of the aforementioned clays, by imposition on the slurry of a high intensity magnetic field. Forces produced upon the particles by the magnetic field gradient, effect differential movements of mineral grains throughout the field, in accordance with the magnetic permeability of the minerals, their size, mass, etc. The difficulties of utilizing magnetic separation are, however, compounded by the fact that the contaminants of greatest interest are of relatively low attractability. The primary magnetic discolorant found in Middle Georgia clays, for example, is iron-stained anatase ($TiO_2$). This impurity is very small in size, and only very weakly magnetic. Indeed, by some early views, contaminants of this general type were considered to be non-magnetic. See for example A. F. Taggart, *Handbook of Mineral Dressing*, page 13-02 (1960), which shows on a scale of 100, taking iron as a standard, that the relative attractability of $TiO_2$ is 0.37.

In the copending patent application of Joseph Iannicelli, Ser. No. 19,169, filed Mar. 13, 1970 now abandoned; Ser. No. 309,839, filed Nov. 27, 1972 now abandoned; and Ser. No. 340,411, filed Mar. 12, 1973, now abandoned which applications are all assigned to the assignee of the instant application, there are disclosed method and apparatus, which in comparison to the prior art, are outstandingly effective in achieving magnetic separation of the low susceptibility impurities referred to. In accordance with the disclosure of said applications, a container adapted to have slurry passed therethrough, is filled with magnetizable elements (preferably steel wool), constituting a flux conductive matrix, which matrix serves both for diverting the slurry flow into multitudinous courses, and for concentrating magnetic flux at myriad locations therein, so as to collect the weakly susceptible particles from the slurry. The container, or canister, as it is referred to therein, is preferably of non-magnetic construction, and is disposed endwise or axially between confronting surfaces of ferromagnetic pole members, between which a magnetic field having a relatively high intensity is produced throughout the matrix. Preferably the said canister is generally cylindrical in form, and is oriented between pole members with its axis vertical, its ends being adjacent to and covered by the pole members. In the first two of the cited Iannicelli applications, the flow of slurry through the canister and matrix is in the same general direction (i.e. axial) as the high intensity magnetic field. In the last cited of the said applications, it is disclosed that certain important advantages accrue from flowing slurry through the canister in such a manner that the predominant direction of flow through the matrix is radial, i.e. from the outside diameter (O.D.) thereof, toward the axis; or from the axis toward the O.D.

In accordance with the operation of apparatus of the foregoing type, the slurry, as taught in the cited Iannicelli applications, is passed through the container at a rate sufficient to prevent sedimentation, yet slow enough to enable the collection and retention of weakly magnetic particles from the flow onto the matrix elements. The magnetic field which is applied during such collection is taught in the said applications to have an intensity of at least 7000 gauss, and preferably has a mean value in the matrix of 8500 gauss or higher. At such field strengths magnetic saturation of the matrix occurs; however, it may also be pointed out, that in the copending application of Robin R. Oder et al, Ser. No. 495,712, filed Aug. 8, 1974, for "Method and Apparatus for Magnetic Beneficiation of Particle Dispersion", now abandoned, it is disclosed that saturation need not necessarily be achieved, and that other factors as, for example, retention time in the matrix, filament size, etc. may be traded off against one another to yet yield effective results.

In any event, after a sufficient quantity of magnetics are collected, customary past practice in the art, dictates that slurry flow be discontinued, and with the field remaining energized the matrix rinsed. By the latter terms, it is meant that the matrix is initially subjected to a relatively gentle flow of "rinse" water, which serves to flow from the canister purified clay fractions still contained therein; and thereupon the matrix is de-energized and subjected to a vigorous flowing action, as by a rapid high pressure flow of water through same, in order to "flush" the collected discoloring contaminants from the matrix, which matrix is thereby regenerated and ready for further use. By and large it may be noted here, that this flushing operation has proved in the prior art to be a difficult one, as the collected particles have proved difficult to dislodge from the surfaces to which they adhere. Thus, for example, while an initial large fraction of the particles may be easily removed, it becomes increasingly difficult to remove by flushing the remaining fractions, with the last part of the adhering particles — those secured directly to the ferromagnetic surfaces — being most resistant to removal.

In accordance with the foregoing, it may be regarded as an object of the present invention, to provide apparatus utilizable with magnetic separating apparatus of the type heretofore discussed, which serve to augment or facilitate the flushing operations used to regenerate the collection matrix, thereby improving the efficiency and effectiveness of said magnetic separation.

SUMMARY OF INVENTION

Now in accordance with the present invention, the foregoing object, and others as will become apparent in the course of the ensuing specification, are achieved by applying auxiliary mechanical forces which act to dislodge the collected magnetics. Application of such auxiliary forces may be brought about between flush operations or, in some instances, may be applied during the flush operations. A variety of instrumentalities may be utilized to effect the foregoing mechanically induced effects: for example, impact, as by vibratory hammering means or so forth, may be directly applied to the canister walls, with resulting shaking or vibration of the matrix. Vibration or shaking of the said matrix may also be effected by applying bucking magnetic fields to the matrix, as for example, by means of auxiliary coils mounted external to the canister itself. Similarly, high intensity sound may be caused to impinge upon the matrix as, for example, by means of transducers (e.g. speakers) mounted at alternate ends of the canister.

In yet another aspect of the invention, auxiliary dislodgment forces may be provided through use of non-conventional flushing fluids, as for example, clay slips. A reflocculated clay slurry may thus provide the increased viscosity, which by augmenting drag forces, serves to dislodge the adhering particles.

Other techniques may be used in addition, to facilitate flushing. Among these are the use of filters possessing density variations in the direction of slurry flow. Where the density thus increases in the direction in which the slurry is flowed during collection, particularly effective flushing may be brought about by directing the flush flow counter to that of the collection flow.

BRIEF DESCRIPTION OF DRAWINGS

The invention is diagrammatically illustrated, by way of example, in the drawings appended hereto, in which.

DESCRIPTION OF PREFERRED EMBODIMENTS

Figure 1:
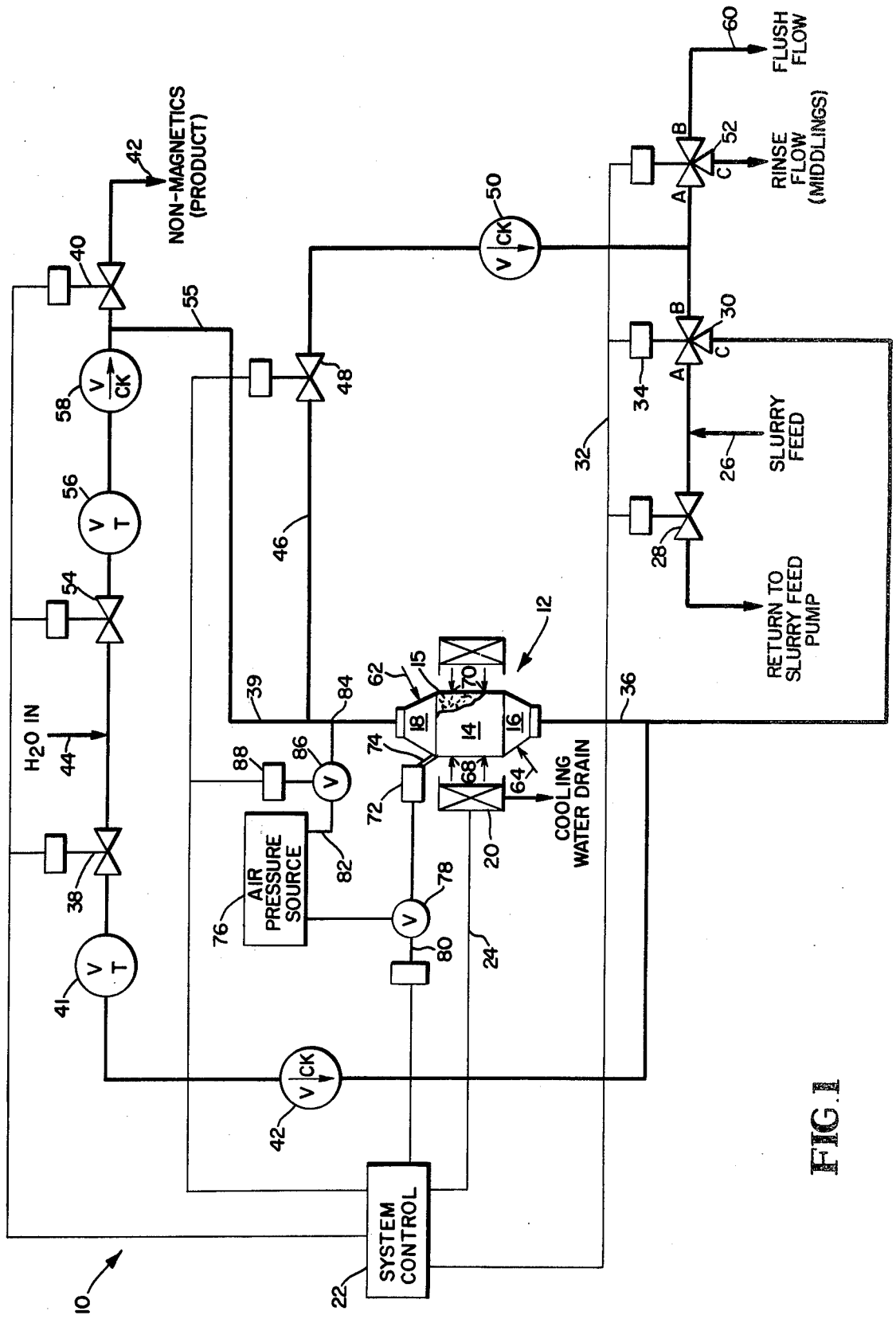
FIG. 1 is a schematic flow diagram, illustrating the type of system to which the present invention has applicability.

In FIG. 1 herein a schematic flow diagram is set forth of a typical system 10, including magnetic separation apparatus 12 of the type with which the present invention may be utilized. Apparatus 12, as it is not per se of the present invention, is set forth only in the broadest schematic terms. The said apparatus may be of the type shown in detail in the aforementioned Iannicelli applications. For purposes of the schematic illustration set forth, apparatus 12 is depicted as including a canister 14, provided with input and output manifolds at 16 and 18, respectively. A ferromagnetic porous matrix 15 which may be considered to be comprised of a stainless steel wool or the like, is mounted within canister 14, so that a clay slurry to be treated therein may be flowed through the canister from end to end. Alternatively, of course, other flow patterns are possible, as the radial flow patterns which are enabled by the apparatus depicted in the aforementioned Ser. No. 340,411 Iannicelli application now abandoned.

In the preferred mode of operation of system 10, flow of the slurry is effected vertically through canister 14 for a period of time with the coil 20, schematically shown as controlled by system control 22, activated so as to establish a magnetic field in the vicinity of the matrix, thereby effecting collecting of magnetics. During this period non-magnetics ("product") is led off to a suitable receptacle. After a sufficient volume of magnetics have been collected, a two-step flow of water is initiated. Thus an initial low velocity flow may be used (with the magnetic field ON) to wash from the collected magnetics, adherent non-magnetic particles. This is the "rinsing" step, during which a so-called "middlings" fraction is collected — which fraction may be reprocessed or included as a portion of the non-magnetics as desired. This rinsing operation is preferably carried out with a flow through the matrix in the same direction as the original slurry flow. Thereafter, a high velocity flow is used (with the magnetic field OFF) to flush the canister of retained magnetics. Preferably this high velocity flush flow is effected in a direction counter to that of both the collection flow and of the rinse flow. The object of so proceeding is to create "new" flow paths through the matrix and about the particles, as opposed to following the preferential flow paths established during collection and rinsing. These new flow paths facilitate removal of particles which otherwise might simply be by-passed by the previously established flow patterns.

In order to enable the foregoing operations, system 10 may therefore generally include a series of electrically activated valves, which in response to the control signals emanating from system control 22, open or close for predetermined periods to divert and/or direct flow to or from canister 14. System control 22 thus may include timing cams and switches to effect the activation of the several valves, and is also connected via lead 24, to magnet coil 20, whereby OFF-ON control of the magnetic field is enabled.

Specifically, during the initial phase of slurry feed, slurry enters the system at line 26 with slurry by-pass valve 28 energized so that slurry feed through line 26 is diverted entirely to feed/drain diverter valve 30. The latter, is also energized (through line 32), whereby flow is through port A-C thereof, then into line 36 and to the input manifold 16 of canister 14. An actuator means 34 — e.g. a solonoid actuator — serves to effect appropriate operation of valves 30. Similar actuator means are associated with each of the valves under system control 22, but for purposes of simplicity are not individually designated with reference numerals. Flow out of the canister is via line 39 which connects to the energized valve 40, and thereby to a non-magnetic collection point 42. As has been previously mentioned, coil 20 of the electro-magnetic is activated during this period.

During the second phase of a typical operation cycle, low pressure rinsing of the canister contents is carried out. With coil 20 still activated, this is effected by closing valve 30 and inactivating valve 28 so that the slurry is by-passed. Water entering the system via line 44 then passes through de-energized valve 38 which acts as a pressure regulating valve, thence through throttle valve 41 and check valve 42, and thence upwardly through canister 14. With valve 40 inactivated the rinse flow proceeds through line 46 and opened valve 48 and check valve 50, and then passes through ports A-C of valve 52, which ports have been opened by system control 22. The output from port C as indicated, may be regarded as a "middlings" fraction, which can be reprocessed or processed as a portion of the non-magnetics. As previously indicated, the rinse flow is seen to be in the same general direction as the original slurry flow.

During the third phase of the operating cycle a high pressure flushing flow is established in a direction opposite to that of the original slurry flow and the rinse flow. In particular, valve 38 is activated to close same, and with valve 54 inactivated, flow proceeds through this latter element, which merely acts as a pressure regulating valve. The flow thence proceeds through a throttle valve 56 and check valve 58, and with valve 40 closed, proceeds through line 55 to manifold 18 of canister 14. The flush flow leaves the bottom of canister 14 through manifold 16, thence proceeding through line 36 to enter port C of valve 30. The flow then proceeds through the port C-B of valve 30, then through the ports A-B of valve 52, exiting through the flush discharge line 60. Valves 30 and 52 are actuated by system control 22 during this period, to enable the indicated flow therethrough.

In accordance with one aspect of the present invention, means are provided for periodically impacting the canister 14 as to agitate the matrix contained therein. In a typical installation, such means may take the form of vibratory impact hammers as, for example, air-actuated hammers, the tips of which are in contact with the canister 14 at various external points. Such an arrangement is schematically illustrated in FIG. 1 by the series of arrows 62, 64, 68, and 70, which indicate typical points of force application. Assuming, for purposes of illustration that the said hammers are indeed air-actuated, a representative transducer 72 having a vibrating tip 74 in contact with canister 14, is schematically suggested. Compressed air for transducer 72 is provided from a source 76, through a valve means 78 positioned in the line 80 between compressed air source 76 and transducer 72. Operation of one or more such transducers is cycled by the system control 22 (through valve 78) so that the auxiliary forces of agitation thereby provided are enabled, either prior to or during the flush cycle.

The impacting forces provided in accordance with the foregoing, act to dislodge particles adhering to the magnetic collection surfaces of the matrix within canister 14, and the resultant localized forces also break up large agglomerates with similar dislodging effect. In a typical application where an air hammer transducer is thus used, a typical operating frequency for the hammer will be of the order of 20 cycles/second, or somewhat higher.

In accordance with a further aspect of the present invention the flushing action occurring within canister 14 may be augmented by the addition of a gas to the flushing water supply. A plurality of bubbles is thereby injected into the flush stream, which acts to increase the turbulence as to the flushing liquid flows through the collection matrix. This may illustratively be accomplished as indicated in FIG. 1, by injection of an air pressure stream from source 76, the stream proceeding via line 82 and entering the flush stream at point 84. Such operation may be enabled through means of the valve 86, a solonoid-operated device, once more controlled through system control 22, connected to solonoid actuator 88.

The arrangement depicted enables a further operation as follows: It has in the past been found that systems of the type set forth in FIG. 1, inevitably produce waste during cycling operations, in consequence of the fact that following flushing the canister remains filled with the flush water — which then must be displaced as the processing of product is reinitiated. This, in turn, requires discarding of initial fractions of the product, i.e. until complete displacement of the flush liquid is effected. Utilizing the arrangement shown in FIG. 1, however, the compressed air proceeding through line 82 may be used alone, subsequent to flushing, to displace all of the flush water remaining in the canister — leaving the latter empty and ready for new processing of product.

Agitation of the matrix contained within canister 14, can also be effected by utilizing the gas flow alone as the agitating medium. That is to say, that following a flushing operation, compressed air proceeding from source 76 may be used not only to remove the flushing liquid remaining in the canister, but the flow of such gas may also be continued through the canister, to in itself provide agitation. In the same respect, other gases may perform agitation functions — i.e. other than air. A useful gas for such purposes is steam, which while it should not be injected simultaneously with the water can be used alone as an agitating medium. Steam, of course, is particularly convenient for use in industrial environments, in that high pressure steam (as is well-known) is often readily available in common plant operations.

The general principle of vibrating or otherwise agitating the collection matrix, can be effected in other ways. For example, sound transducers may be positioned at various points within canister 14. Preferably, e.g. such transducers are disposed at opposite ends thereof, and during or between flushings electrical energy is applied to the transducers. The vibratory sonic energy thereby introduced at the vicinity of the matrix, effects vibration thereof, with corresponding salutary results.

In accordance with yet a further aspect of the present invention, flushing of the collection matrix may be effected by utilizing as flushing media, fluids exhibiting higher viscosities than that possessed by the water conventionally used. While theoretically any liquid may be so used, providing only that the liquid employed does not contaminate the matrix as to introduce undesired impurities into the product, a preferable fluid for such purposes is a clay slip itself — since it will be obvious that no danger of contamination can thus exist. In a typical instance, a slip to be used for such purposes, may include about 30% solids. A particularly useful slip includes a thickened or reflocculated clay.

When flushing with relatively viscous liquids, it is desirable to provide as great a velocity as practical, in order to assure a high degree of turbulence. Such turbulence in turn, produces the increased shear against the adherent particles.

Experimental results have verified that the addition of air in the manner described above, improves magnetic separation, both where counter-current or co-current flushing is utilized. By "counter-current" it is meant that the direction of flushing is substantially opposed to the flow direction during collection of magnetics; similarly the term "co-current" means that flush flow is substantially in the same direction as the collection flow. Thus, e.g., bubbling air through the canister during flushing increases the clean-out efficiency of the flushing operation. In a typical experimental procedure, for example, a typical Kaolin clay slurry was pumped through a canister of the type illustrated in FIG. 1, for 15 minutes at a 4 minute retention time, resulting for the particular canister configuration in a treatment rate of 800 cc/min. The magnet was energized while rinse water was pumped through the canister for 10 additional minutes at an 800 cc/minute rate. The magnet was thereupon de-energized, and flush water pumped through the canister for 10 minutes at a rate of 1600 cc/minute. The magnetic fraction from the flushing step was flocculated, concentrated, dried and weighed. The same procedure was repeated for each of four flushing methods. After each test the steel wool comprising the matrix was removed from the canister and thoroughly cleaned with external washing prior to the next run. The results in the four instances are set forth in the Table below:

| Test | Method of Flushing | Addition of Air | Magnetic Fraction | |
|---|---|---|---|---|
| | | | Grams Collected | Brightness |
| 1 | Countercurrent | No | 96.0 | 61.30 |
| 2 | Countercurrent | Yes | 100.0 | 57.60 |
| 3 | Co-current | No | 92.0 | 64.00 |
| 4 | Co-current | Yes | 96.0 | 61.85 |

Brightness is an indication of the concentration of impurities. Lower brightness indicates a more concentrated amount of impurities. From the Table above, it is apparent that countercurrent flushing is superior to co-current flushing; and furthermore, the addition of air during either mode of flushing improved removal of the magnetic fraction. From the magnetic fraction brightness, indicated in the above Table, it will be further evident that the highly discolored magnetic components are the most difficult to remove from the collection matrix during flushing. (All brightness data refer to measurements made according to the Standard TAPPI procedure T 646m-54.)

Figure 2:
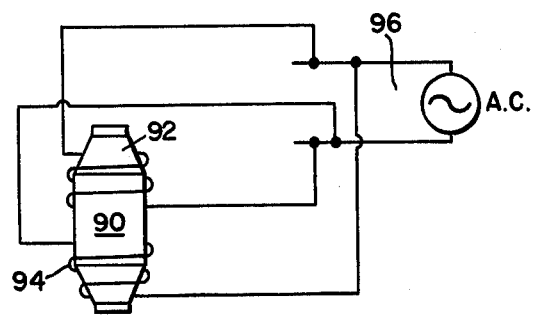
FIG. 2 schematically illustrates the manner in which a plurality of current-carrying coils may be associated with a matrix and canister, in order to effect vibration or shaking of the matrix.

In FIG. 2 a schematic diagram is set forth, illustrating how a plurality of current-carrying coils may be associated with a matrix-containing canister in order to effect shaking of the matrix. In this instance the canister 90 may be assumed to be of non-magnetic material, with the conventional steel wool matrix previously referred, being contained therein. A pair of coils 92 and 94 is shown wrapped about alternate ends of canister 90. Each of the coils 92 and 94 is connected to the conventional A.C. power lines 96. However, it will be seen that the said electrical connections are such that the current flow in the respective coils are in opposition to one another. The effect of this arrangement is that the magnetic fields generated by the respective coils buck one another continuously — with the minimum magnetic field being present toward the center of the canister and the intensity of the fields increasing away from the center. The result of this arrangement is to introduce a strong fluctuating gradient in the magnetic fields at the vicinity of the matrix, which tends to shake or vibrate such matrix. While but two such coils are shown in the schematic illustration of FIG. 2, any convenient number of such bucking coils may be utilized. The said coils are activated to perform their shaking or vibratory action, either during the flushing operation or prior to flushing. The resultant agitation loosens the particles which are adherent to the matrix, thereby enabling removal of such particles during flushing with the appropriate fluid.

Figure 3:
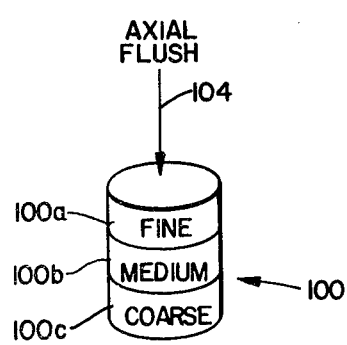
FIG. 3 schematically illustrates a graded density matrix useful in connection with the invention.
Figure 4:
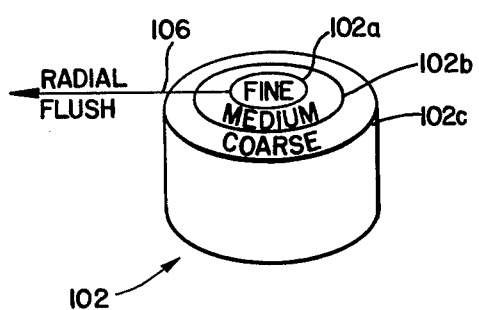
FIG. 4 schematically depicts a further type of graded density matrix useful with the invention.

In accordance with yet a further aspect of the present invention, flushing of the ferromagnetic matrices constituting the collection elements of the systems treated herein, may be facilitated by providing for appropriate density variations in the steel wool or other porous material constituting said matrix. Thus in FIGS. 3 and 4 herein, highly schematic views appear of separation matrices 100 and 102, formed overall of filamentatious material, such as steel wool. These matrices are, of course, during use normally contained within a canister 14, of the type described throughout the course of the present specifications. The matrices are characterized in being provided with successive zones, which differ with respect to the fineness of filamentary sizes therein. The matrix 100 is thus seen to include an uppermost cylindrical zone 100a of relatively fine filament size, a middle cylindrical zone 100b, of medium filament size, and an underlying zone 100c, of relatively coarse filament size. The arrangement of FIG. 3 is particularly useful where an axial flush flow, proceeding as indicated by arrow 104 in the direction of the coarser material is utilized. This is to say that the matrix of the type shown in FIG. 3, is particularly applicable to a system arrangement as set forth in FIG. 1. Under such use conditions a flush flow proceeds toward increasingly open material, whereby the particles dislodged from the finer material tend to be more effectively swept outward from the points of collection. The initial slurry feed flow in FIG. 3 is, of course, preferably axial and in the direction opposite to arrow 104. This enables the flow to pass initially through the coarse zone 100c where the larger, more easily removed particles come out. Thereafter, the smaller particles will be removed at zones 100b and 100a, by this arrangement the matrix will not become choked by the larger particles, which, rather, come out at an early stage in the flow pattern.

It has been previously mentioned that other types of flow through the canisters considered herein may be utilized — i.e. other than axial flow. In particular, it has been mentioned that a radial flow, such as that disclosed in the cited Iannicelli application Ser. No. 340,411, now abandoned, may effectively be utilized in apparatus of the type generally considered herein. Accordingly, in FIG. 4 there is set forth a corresponding arrangement for the case where the matrix 102 is divided into successive annular zones 102a, 102b and 101c, of successively decreasing fineness. Here, in analogy to the case described in FIG. 3, the flush flow is assumed to be in the direction of arrow 106, i.e. radially outward from the finer to the coarser material; and the initial feed flow is preferably directed inwardly, along a generally radial direction. It should, of course, be appreciated in connection with the foregoing, that various sequential combinations of axial and/or radial flows may be utilized, in which case the graded density variations would be appropriately adjusted to enable the effects described.

In particular, with or without, maintaining the uniformity of filamentary strand sizes, the various zones may be made to vary in density by varying the packing density, i.e., the degree or extent of compaction of the fibers, in a given zone.

Thus, in matrix 100 zone 100a might be compacted to the extent that the strands occupy 14% of the volume of the zone, 100b to a density of 10% and 100c to density of 6%.

In a like manner zone 102a might have a packed density of 14%, while 102b and 102c might be compacted to a density of 10% and 6% respectively.

Combinations of various zones based on variations both in filamentary strand size and in degree of compression may of course be employed.

While the present invention has been particularly set forth in terms of specific embodiments thereof, it will be understood in view of the instant disclosure, that numerous variations upon the invention are now enabled to those skilled in the art, which variations yet reside within the scope of the instant teaching. Accordingly, the invention is to be broadly construed, and limited only by the scope and spirit of the claims now appended hereto.

I claim:

1. In a system for effecting the magnetic separation of magnetically attractable particles from a dispersion of such particles in a fluid carrier, said system being of the type including a non-magnetic cylindrical canister containing a ferromagnetic filamentations matrix therewithin and having inlet means at one end of said cylindrical canister and outlet means at the opposite end of said cylindrical canister; an electromagnetic coil surrounding said cylindrical canister for generating a magnetic field within said canister disposed in said field; means for flowing said dispersion axially through said matrix within said cylindrical canister from its inlet means to its outlet means and means for providing a flushing flow through said matrix to remove collected particles from the matrix to regenerate the same; the improvement comprising:

a filamentation matrix having gradiations in density provided by successive zones of uniform density, wherein said zones are consecutively overlying cylinders, defining in total the cylindrical matrix, with each zone being more dense than its successor in the axial direction of fluid flow provided by the means for flowing the fluid through the canister from its inlet means to its outlet means for effecting the magnetic separation of magnetically attractable particles from said dispersion and with each zone being less dense than its successor in the axial direction of flushing flow provided by means for flowing a fluid from said outlet to said inlet means of said canister to remove collected particles from the matrix to regenerate the same.

2. In a system for effecting the magnetic separation of magnetically attractable particles from a dispersion of such particles in a fluid carrier, said system being of the type including a non-magnetic cylindrical canister containing a ferromagnetic filamentations matrix therewithin and having inlet means at one end of said cylindrical canister and outlet means at the opposite end of said cylindrical canister; an electromagnetic coil surrounding said cylindrical canister for generating a magnetic field within said canister disposed in said field; means for flowing said dispersion axially through said matrix within said cylindrical canister from its inlet means to its outlet means and means for providing a flushing flow through said matrix to remove collected particles from the matrix to regenerate the same; the improvement comprising:

a filamentations matrix having gradations in strand diameter provided by successive zones of uniform strand diameter, wherein said zones are consecutively overlying cylinders, defining in total the cylindrical matrix, with each zone being composed of smaller diameter strands than its successor in the axial direction of fluid flow provided by the means for flowing the fluid through the canister from its inlet means to its outlet means for effecting the magnetic separation of magnetically attractable particles from said dispersion and with each zone being composed of larger diameter strands than its successor in the axial direction of flushing flow provided by means for flowing a fluid from said outlet to said inlet means of said canister to remove collected particles from the matrix to regenerate the same.

3. In a system for effecting the magnetic separation of magnetically attractable particles from a dispersion of such particles in a fluid carrier, said system being of the type including a non-magnetic cylindrical canister containing a ferromagnetic filamentations matrix therewithin and having inlet means at one end of said cylindrical canister and outlet means at the opposite end of said cylindrical canister; an electromagnetic coil surrounding said cylindrical canister for generating a magnetic field within said canister disposed in said field; means for flowing said dispersion axially through said matrix within said cylindrical canister from its inlet means to its outlet means and means for providing a flushing flow through said matrix to remove collected particles from the matrix to regenerate the same; the improvement comprising:

a filamentations matrix having gradations in density and strand diameter provided by successive zones of uniform density and strand diameter, wherein said zones are consecutively overlying cylinders, defining in total the cylindrical matrix, with each zone being more dense and of smaller strand diameter than its successor in the axial direction of fluid flow provided by the means for flowing the fluid through the canister from its inlet means to its outlet means for effecting the magnetic separation of magnetically attractable particles from said dispersion and with each zone being less dense of larger diameter strands than its successor in the axial direction of flushing flow provided by means for flowing a fluid from said outlet to said inlet means of said canister to remove collected particles from the matrix to regenerate the same.

4. In a system for effecting the magnetic separation of magnetically attractable particles from a dispersion of such particles in a fluid carrier, said system being of the type including a non-magnetic cylindrical canister containing a ferromagnetic filamentations matrix therewithin and having inlet means to provide a feed flow from the outer annulus of said cylindrical canister radially inward to centrally located, axially disposed outlet means within said cylindrical canister; an electromagnetic coil surrounding said cylindrical canister for generating a magnetic field within said canister disposed in said field; means for flowing said dispersion radially through said matrix within said cylindrical canister from its inlet means to its outlet means and means for providing a flushing flow through said matrix to remove collected particles from the matrix to regenerate the same; the improvement comprising:

a filamentations matrix having gradations in density provided by successive zones of uniform density, wherein said zones are successive annuli, defining in total the cylindrical matrix, with each zones being more dense than its successor in the radially inward direction of fluid flow provided by the means for flowing the fluid radially into the canister from its inlet means to its outlet means for effecting the magnetic separation of magnetically attractable particles from said dispersion and with each zone being less dense than its successor in the radial direction of flushing flow provided by means for radially flowing a fluid from said axially disposed, centrally located outlet to said inlet means disposed adjacent the outer annulus within said canister to remove collected particles from the matrix to regenerate the same.

5. In a system for effecting the magnetic separation of magnetically attractable particles from a dispersion of such particles in a fluid carrier, said system being of the type including a non-magnetic cylindrical canister containing a ferromagnetic filamentations matrix therewithin and having inlet means to provide a feed flow from the outer cennulus of said cylindrical canister radially inward to centrally located, axially disposed outlet means within said cylindrical canister; an electromagnetic coil surrounding said cylindrical canister for generating a magnetic field within said canister disposed in said field; means for flowing said dispersion radially through said matrix within said cylindrical canister from its inlet to its outlet means and means for providing a flushing flow through said matrix to remove collected particles from the matrix to regenerate the same; the improvement comprising:

a filamentations matrix having gradations in strand diameter provided by successive zones of uniform strand diameter, wherein said zones are successive annuli, defining in total the cylindrical matrix, with each zone being a smaller diameter than its successor in the radially inward direction of fluid flow provided by the means for flowing the fluid radially into the canister from its inlet means to its outlet means for effecting the magnetic separation of magnetically attractable particles from said dispersion and with each zone being composed of larger diameter strands than its successor in the radial direction of flushing flow provided by means for radially flowing a fluid from said axially disposed, centrally located outlet to said inlet means disposed adjacent the outer annulus within said canister to remove collected particles from the matrix to regenerate the same.

6. In a system for effecting the magnetic separation of magnetically attractable particles from a dispersion of such particles in a fluid carrier, said system being of the type including a non-magnetic cylindrical canister containing a ferromagnetic filamentations matrix therewithin and having inlet means to provide a feed flow from the outer annulus of said cylindrical canister raidally inward to centrally located, axially disposed outlet means within said cylindrical canister; an electromagnetic coil surrounding said cylindrical canister for generating a magnetic field within said canister disposed in said field; means for flowing said dispersion radially through said matrix within said cylindrical canister from its inlet means to its outlet means and means for providing a flushing flow through said matrix to remove collected particles from the matrix to regenerate the same; the improvement comprising:

a filamentations matrix having gradations in density strand diameter provided by successive zones of uniform density and strand diameter, wherein said zones are successive annuli, defining in total the cylindrical matrix, with each zone being more dense and of smaller diameter than its successor in the radially inward direction of fluid flow provided by the means for flowing the fluid radially into the canister from its inlet means to its outlet means for effecting the magnetic separation of magnetically attractable particles from said dispersion and with each zone being less dense and composed of larger diameter strands than its successor in the radial direction of flushing flow provided by means for radially flowing a fluid from said axially disposed, centrally located outlet to said inlet means disposed adjacent the outer annulus within said canister to remove collected particles from the matrix to regenerate the same.

* * * * *

UNITED STATES PATENT AND TRADEMARK OFFICE
CERTIFICATE OF CORRECTION

PATENT NO. : 4,147,632
DATED : April 3, 1979
INVENTOR(S) : Robin R. Oder

It is certified that error appears in the above-identified patent and that said Letters Patent are hereby corrected as shown below:

Column 8, line 50, "101c" should be -- 102c --.

Column 9, line 35, "gradiations" should be -- gradations --.

Column 12, lines 12-13, "raidally" should be -- radially --.

Signed and Sealed this

Twenty-fifth Day of September 1979

[SEAL]

Attest:

LUTRELLE F. PARKER

Attesting Officer

Acting Commissioner of Patents and Trademarks